(12) United States Patent
Wiseman et al.

(10) Patent No.: US 10,690,203 B2
(45) Date of Patent: Jun. 23, 2020

(54) BRAKE DISC

(71) Applicant: ALCON COMPONENTS LIMITED, Staffordshire (GB)

(72) Inventors: Garry Wiseman, Warwick (GB); Phillip Smith, Staffordshire (GB)

(73) Assignee: ALCON COMPONENTS LIMITED, Tamworth (GB)

(*) Notice: Subject to any disclaimer, the term of this patent is extended or adjusted under 35 U.S.C. 154(b) by 89 days.

(21) Appl. No.: 15/563,052

(22) PCT Filed: Mar. 30, 2016

(86) PCT No.: PCT/GB2016/050890
§ 371 (c)(1),
(2) Date: Sep. 29, 2017

(87) PCT Pub. No.: WO2016/156838
PCT Pub. Date: Oct. 6, 2016

(65) Prior Publication Data
US 2018/0372175 A1     Dec. 27, 2018

(30) Foreign Application Priority Data

Mar. 31, 2015  (GB) .................................. 1505576.7

(51) Int. Cl.
*F16D 65/12*     (2006.01)
*F16D 65/847*    (2006.01)
(Continued)

(52) U.S. Cl.
CPC .......... *F16D 65/128* (2013.01); *B22D 25/02* (2013.01); *F16D 65/847* (2013.01);
(Continued)

(58) Field of Classification Search
CPC ............... F16D 65/12; F16D 65/128; F16D 2065/1316; F16D 2065/1328;
(Continued)

(56) References Cited

U.S. PATENT DOCUMENTS 3,732,953 A * 5/1973 Huet ..................... F16D 65/125
188/218 XL
3,773,153 A * 11/1973 Smirl ..................... F16D 13/72
188/218 XL
(Continued)

FOREIGN PATENT DOCUMENTS

CN   204025464 U    12/2014
DE   4331683 A1 *  3/1994   ................ B60T 5/00
(Continued)

OTHER PUBLICATIONS

Search Report issued in App. No. GB1505576.7 (2015).
Search Report and Written Opinion issued in Int'l App. No. PCT/GB2016/050890 (2016).

*Primary Examiner* — Bradley T King
*Assistant Examiner* — Mahbubur Rashid
(74) *Attorney, Agent, or Firm* — Barnes & Thornburg LLP

(57) ABSTRACT

A ventilated brake disc has a disc body having a first disc plate, a second disc plate and a vane structure between the first and second disc plates, the vane structure separating the first and second disc plates to allow passage of fluid therebetween, in which the vane structure defines a plurality of vanes, which vanes connect the first and second disc plates, are swept to extend in a radial and circumferential direction of the disc body and define a plurality of protrusions on at least one circumferentially facing side.

20 Claims, 10 Drawing Sheets

(51) Int. Cl.
*B22D 25/02* (2006.01)
*F16D 65/02* (2006.01)

(52) U.S. Cl.
CPC ........... *F16D 2065/1328* (2013.01); *F16D 2065/1344* (2013.01); *F16D 2200/0004* (2013.01); *F16D 2250/0015* (2013.01)

(58) Field of Classification Search
CPC ........... F16D 65/847; F16D 2065/13; F16D 2065/1332; F16D 2250/00; F16D 2250/0092; F16D 2065/1304; F16D 2065/788; F16D 2069/0491; B22D 17/00; B22D 19/0072; B22D 25/02
See application file for complete search history.

(56) References Cited

U.S. PATENT DOCUMENTS

| | | | |
|---|---|---|---|
| 4,805,747 A | 2/1989 | Moedinger et al. | |
| 4,811,822 A * | 3/1989 | Estaque | H02K 49/046 |
| | | | 188/264 A |
| 5,427,212 A * | 6/1995 | Shimazu | B60T 5/00 |
| | | | 188/218 XL |
| 5,878,848 A | 3/1999 | Zhang | |
| 6,308,808 B1 | 10/2001 | Krenkel et al. | |
| 7,267,210 B2 * | 9/2007 | Cornolti | F16D 65/12 |
| | | | 188/218 XL |
| 7,353,919 B2 | 4/2008 | Christ | |
| 2001/0002638 A1 * | 6/2001 | Kobayashi | F16D 65/128 |
| | | | 188/218 XL |
| 2001/0032758 A1 * | 10/2001 | Ruiz | F16D 65/12 |
| | | | 188/71.6 |
| 2004/0118644 A1 * | 6/2004 | Oberti | B22C 7/06 |
| | | | 188/218 XL |
| 2004/0163902 A1 * | 8/2004 | Meroni | F16D 65/0006 |
| | | | 188/218 XL |
| 2004/0188196 A1 * | 9/2004 | Gavin | F16D 65/12 |
| | | | 188/218 XL |
| 2008/0067018 A1 | 3/2008 | Smith et al. | |
| 2008/0223035 A1 | 9/2008 | Smith et al. | |
| 2009/0000884 A1 * | 1/2009 | Layton | F16D 65/0006 |
| | | | 188/218 XL |
| 2010/0084231 A1 * | 4/2010 | Biondo | F16D 65/12 |
| | | | 188/218 XL |
| 2010/0206675 A1 * | 8/2010 | Miyake | F16D 65/12 |
| | | | 188/218 XL |
| 2010/0230221 A1 * | 9/2010 | Biondo | F16D 65/12 |
| | | | 188/218 XL |
| 2011/0108378 A1 * | 5/2011 | Leone | F16D 65/128 |
| | | | 188/218 XL |
| 2012/0168266 A1 * | 7/2012 | Veneziano | F16D 65/12 |
| | | | 188/218 XL |
| 2014/0158486 A1 * | 6/2014 | Schorn | F16D 65/12 |
| | | | 188/218 XL |
| 2015/0247541 A1 * | 9/2015 | Nogami | B61H 5/00 |
| | | | 188/218 XL |

FOREIGN PATENT DOCUMENTS

| | | | | |
|---|---|---|---|---|
| DE | 10-235109 | | 2/2004 | |
| DE | 10-2010-060781 | | 5/2012 | |
| GB | 1403828 | | 8/1975 | |
| GB | 2144186 | | 2/1985 | |
| GB | 2543020 A | * | 4/2017 | ........ F16D 65/128 |
| WO | WO 2016/174426 | | 11/2016 | |
| WO | WO-2017153873 A1 | * | 9/2017 | ........ F16D 65/128 |

* cited by examiner

BRAKE DISC

CROSS REFERENCE TO RELATED APPLICATIONS

This application is a U.S. nationalization under 35 U.S.C. § 371 of International Application No. PCT/GB2016/050890, filed Mar. 30, 2016, which claims priority to United Kingdom Patent Application No. 1505576.7, filed Mar. 31, 2015. The disclosures set forth in the referenced applications are incorporated herein by reference in their entireties.

The present invention is concerned with a brake disc. More specifically, the present invention is concerned with a ventilated brake disc for motorsport and high performance road car disc brakes.

Disc brakes are well known in the art of vehicle design. In such brakes, a brake disc rotates with the vehicle wheel. A brake caliper straddles the disc and comprises opposed brake pads, configured to clamp the brake disc therebetween following a brake demand. Brake discs are usually constructed from grey iron. The brake pads are usually constructed from a high friction compound. When clamped, friction between the pads and the disc creates a drag force on the disc to slow rotation of the wheel and hence the vehicle. In doing so, the kinetic energy of the vehicle is converted to thermal energy created by friction. The thermal energy heats the pads and disc, and is dissipated by the heat transfer mechanisms of conduction, convection and radiation.

Several types of disc brake are known in the art. One type is the sliding, or floating, caliper disc brake, in which one of the pads is movably mounted to the caliper and the other fixed to the caliper. The caliper itself can move such that application of the movable pad (usually by one more hydraulic cylinders) to the disc acts to drag the caliper and the opposing pad into contact with the disc to thereby clamp it. This type of brake is common on commercially available vehicles such as production cars. Another type of disc brake is the fixed caliper type, in which the caliper is stationary and each opposing pad is urged towards the other to clamp the disc under the action of one or more actuators—typically hydraulic cylinders. This type of disc brake is more common in motorsport and high performance road cars.

In motorsport in particular, dissipation of heat is problematic. Due to the duty cycle of the brake in a race, involving many severe braking operations, a significant amount of thermal energy needs to be dissipated. Allowing the brake pads and disc to become too hot can cause several problems, and in particular a reduction in braking effect. One solution would be to increase the size of the brake to reduce the thermal energy per unit mass of disc and pad, however this is not always possible. In motorsport there are often tight restrictions on the size envelope for the disc. It is also undesirable to increase the weight of the vehicle in this way.

It is known to provide a vented, or ventilated, disc in order to improve the rate of thermal dissipation from the disc to the surrounding environment, and thereby lower its temperature. A known ventilated disc 10 is shown in FIG. 1, in which the right hand side is shown in section. The disc has a hub region H and a rim R. The disc has an axis of rotation X, and the axial, radial and circumferential directions are defined with respect to this axis. The disc 10 comprises a generally annular disc body 12 having a first disc plate 14, a second disc plate 16 and a vane structure 18 between the first and second disc plates, the vane structure separating the first and second disc plates. The spacing between the disc plates 14, 16 allows passage of air. The vane structure 18 defines a plurality of vanes 18a, 18b etc which connect the first and second disc plates 14, 16 and extends in a radial direction.

During vehicle motion, the disc 10 rotates in direction D. As it does so, ambient air is entrained by the vanes 18 and moved from the hub to the rim due to a centrifugal pumping effect. The disc 10 therefore acts like an impeller in a centrifugal pump. As air passes from the hub H to the rim R, heat is conducted to it via conduction from the hot disc body 12. Convection of the air towards the rim R and out of the disc body 12 moves the heat away. Therefore encouraging a radial air flow in this manner helps to cool the disc body 12.

The brake disc 10 is manufactured by casting. In order to cast a ventilated disc, which contains both an axial bore (at the centre) and radial through-holes (between the plates), a sand core needs to be used, which is a negative of the disc cavities between the vanes.

The first stage of the process is to machine a two-piece core box which acts as a mould for the sand core. The core box is a partial pattern of the finished disc, and in particular defines the vane shape. The core box is machined from solid in two parts (split midway through the thickness of the disc in an axial direction). A cutting head is used to machine the channels between each vane. Therefore the vanes must be spaced apart by a distance sufficient to allow passage of the cutting head. When placed together, the core box defines a mould for the sand core. Sand is introduced into the core and consolidated to form the core. The core of sand is then demoulded. At this point, the core is a negative of the disc cavities.

The core is then mounted into a moulding box, and together they form a mould profile for the complete disc. Molten metal is introduced into the moulding box with the core in situ, and solidified. The disc (with the sand core intact) can then be demoulded. The sand core is broken up in situ (e.g. by vibration) and removed.

Although the prior art disc benefits from a cooling effect as described above, what is required is an improved level of cooling which will improve brake performance by lowering the disc temperature. However this effect is achieved, it preferably needs to be compatible with the aforementioned manufacturing method. Other manufacturing method are available (for example rapid prototyping techniques), but at the time of writing, the aforementioned casting method is both the most widely used and cost effective technique.

It is an aim of the present invention to provide an improved ventilated brake disc.

According to a first aspect of the invention there is provided a ventilated brake disc comprising a disc body having a first disc plate, a second disc plate and a vane structure between the first and second disc plates, the vane structure separating the first and second disc plates to allow passage of fluid therebetween, in which the vane structure defines a plurality of vanes, which vanes connect the first and second disc plates, are swept to extend in a radial and circumferential direction of the disc body and define a plurality of protrusions on at least one circumferentially facing side.

Advantageously, the protrusions create recirculating regions which promote mixing in the boundary layer of the cooling air and hence improve heat transfer between the vanes and the cooling air. The combination of this effect and the swept shape of the vanes leads to significant improvements in heat transfer away from the disc body by conduction, followed by convection. In particular, the present invention is particularly effective in vehicles having pressurised cooling air inlets in the vehicle hub, such as motorsport vehicles with air scoops/ducts for brake cooling.

Preferably, the protrusions extend normal, or perpendicular, to the vane surface. If the vane surface is shaped as an arc, the protrusions point in a generally radial direction. Advantageously, this means that the protrusions sit directly in the inter-vane flow path, and thus cause maximum turbulence to enhance heat transfer.

Preferably the distance between at least two adjacent protrusions of the plurality of protrusions (on the same vane) is greater than their circumferential height. This creates large regions of recirculating air between the protrusions, which regions are initiated by the trailing edge vortices of the protrusions themselves. Advantageously, the effect is enhanced when the areas of recirculation are larger than the protrusions. More preferably the distance between at least two adjacent protrusions of the plurality of protrusions is at least twice the circumferential height of the protrusions, and even more preferably the distance between at least two adjacent protrusions of the plurality of protrusions is at least four times the circumferential height of the protrusions.

Preferably the distance between at least two adjacent protrusions of the plurality of protrusions is less than ten times the circumferential height of the protrusions. Having too great a distance between protrusions is not beneficial because fewer protrusions (and hence areas of recirculation) can be formed on each vane. More preferably the distance between at least two adjacent protrusions of the plurality of protrusions is less than seven times the circumferential height of the protrusions.

Therefore, most preferably, the distance between at least two adjacent protrusions of the plurality of protrusions is between four and seven times the circumferential height of the protrusions.

Preferably the at least two adjacent protrusions are separated by a land, in which the land has a flat or curved profile having a curvature less than the curvature of the protrusions. By "curvature", we mean a high curvature is a tight curve (e.g. with a small radius), and a low curvature is a shallow curve (e.g. with a large radius). Preferably the concave curvature of the land is less than the convex curvature of the protrusions. Preferably the lands are shallow concave curves which encourage formation of elliptical regions of recirculation. In other words, the lands a relatively flat regions between, and compared to, the protrusions.

Preferably the vane on which the adjacent protrusions are defined has a curved profile, and in which the profile of the land generally follows the curved profile of the vane.

Preferably the vanes have a first set of protrusions on a first side, and a second set of protrusions on a second, opposite side, in which at least some of the protrusions on the first side are opposite lands on the second side. This improves the structural integrity of the vane, because it has fewer regions of low thickness. It also improves heat transfer, as the areas of recirculation are staggered to encourage more even conduction of heat. Preferably there are more protrusions on the first side than the second side. Preferably there are at least two more protrusions on the second side than on the first side.

Preferably, the lands on the second side are shaped such that the thickness of the vane remains substantially constant along its length.

Preferably two adjacent vanes have sets of protrusions on facing sides, in which the at least some of the protrusions face lands on the adjacent vane in a direction normal, or perpendicular to the vane on which the protrusion is defined (i.e. a radial direction of the vane). This is highly advantageous, as it allows a generally uniform width flow path whilst setting up staggered areas of recirculation which are evenly distributed along the flow channel. This significantly improves heat transfer, and eliminates any "choke points" in the flow channel which would inhibit flow, and would otherwise be caused by opposing protrusions. Preferably all of the protrusions face lands on the adjacent vane.

Preferably at least some of the protrusions lie on, or outside, a protrusion clearance radius extending from each of the two nearest protrusions on the adjacent vane. This reduces the aforementioned choke points, and also allows the passage of a cutter during core box manufacture. Preferably the protrusion clearance radius is at least three times the height of the protrusions. This ratio has been found to be beneficial for heat transfer, forming a combination of laminar flow through the centre of the flow channel (for convection) and recirculating flow at the peripheries (for conduction) with the number of vanes required for structural purposes.

Preferably a single flow channel is defined between adjacent vanes, which flow channel has a generally serpentine path. The flow channel does not branch or split.

The vanes define a dimension Vp which is the distance between a pair of curves joining the ends or tips of the protrusions on each side of the vane body. The vane structure is also defined by an inter-vane distance IVD—i.e. the distance between the curve joining the leading edge on a first vane and the curve joining the trailing edge on a second, adjacent vane. Preferably Vp<0.5 IVD<1.0 Vp at any given position between the endmost protrusions on the vane. More preferably Vp<0.6 IVD<0.8 Vp. This provides a compromise between the number of vanes (determined by IVD) and providing a flow path between them which allows a beneficial cooling effect to occur in the aforementioned manner.

Preferably the protrusions have curved profiles. More preferably the protrusions comprise a tip defined by a convex curve. Even more preferably the tip of the protrusions meets concave root portions on either side of the tip. This curved shape is beneficial for manufacture (it can be machined with a traditional cutting head) and is also beneficial for establishing the aforementioned recirculating flow for heat transfer. Preferably the radius of the convex tip is equal to, or less than, the height of the protrusions. This provides the best flow for heat transfer.

Preferably the vanes lie on circle segments. By this, we mean that a circle segment extending from the vane tip at the hub to the vane tip at the rim will lie within the vane body. Preferably, each vane lies on a single circle segment, although alternatively each vanes may lie on more than one circle segment of differing radii. If this is the case, the smaller radius is preferably at the hub end of the vane.

Preferably the tangent of the vane at a radially inner tip of the vane makes an inlet angle with a radial line extending from the centre of the brake disc, and in which the tangent of the vane at a radially outer tip makes an outlet angle with a radial line extending from the centre of the brake disc, and in which the outlet angle is greater than the inlet angle.

According to a second aspect of the invention, there is provided a brake assembly for a vehicle comprising a ventilated brake disc according to the first aspect, in which the ventilated brake disc is arranged to rotate in a direction with the radially inner ends of the vanes leading the radially outer ends when the vehicle is in forward motion. This means that the convex leading (first) surfaces of the vanes become pressure faces, and the concave trailing (second) surfaces become suction faces.

According to a third aspect of the invention, there is provided a wheel assembly for a vehicle comprising a disc brake having a ventilated brake disc according to the first aspect, and a pressurised air duct comprising an outlet exhausting into a hub region of the brake disc. The combination of swept vanes with protrusions is highly beneficial in reducing brake disc temperature this instance. The vane sweep forces the cooling air to follow a curved path, and in doing so creates recirculating regions proximate the protrusions. Therefore the curvature of the vanes and the use of protrusions have a synergistic effect leading to improved cooling.

Preferably the duct has an inlet facing in the forward direction of travel of the vehicle in use.

According to a fourth aspect of the invention there is provided method of manufacture of a ventilated brake disc comprising the steps of:
- manufacturing a first core pattern defining a first disc plate of a brake disc and a first plurality of vane portions extending therefrom;
- manufacturing a second core pattern defining a first disc plate of a brake disc and a second plurality of vane portions extending therefrom;
- in which the vanes of the first and second pluralities of vane portions define protrusions separated by lands, the protrusions on a given first vane of the plurality facing lands on an adjacent vane;
- assembling the first and second core patterns to form a core cavity;
- forming a mould core in the core cavity;
- providing a mould for a brake disc;
- assembling the mould core and the mould to form a disc cavity;
- filling the mould with a molten material;
- allowing the molten material to set to form a brake disc;
- demoulding the brake disc.

By "pattern", we mean positive representation of at least part of the part being formed (in this case a replica of at least part of the vane structure of the disc). Advantageously formation of patterns with vanes having protrusions facing lands provides thermodynamic benefits in the finish disc, but is also straightforward to manufacture, as the cutting path can be made serpentine in nature. If the protrusions were facing, this would necessitate higher spacing between vanes to allow the cutter to pass between facing protrusion tips. This, in turn, would reduce the number of vanes, and reduce the strength of the disc. The protrusions face the lands in a direction perpendicular, or normal, to the vane on which the protrusion lies. Preferably the steps of manufacturing the first and second patterns include the step of machining the vanes from solid.

Preferably the step of machining the vanes from solid includes the step of making at least one complete pass with a machine cutter from a radially inner end of the vanes to a radially outer end of the vanes or vice versa.

Several example brake discs, and a method according to the present invention will now be described with reference to the appended Figures, in which.

Figure 1:
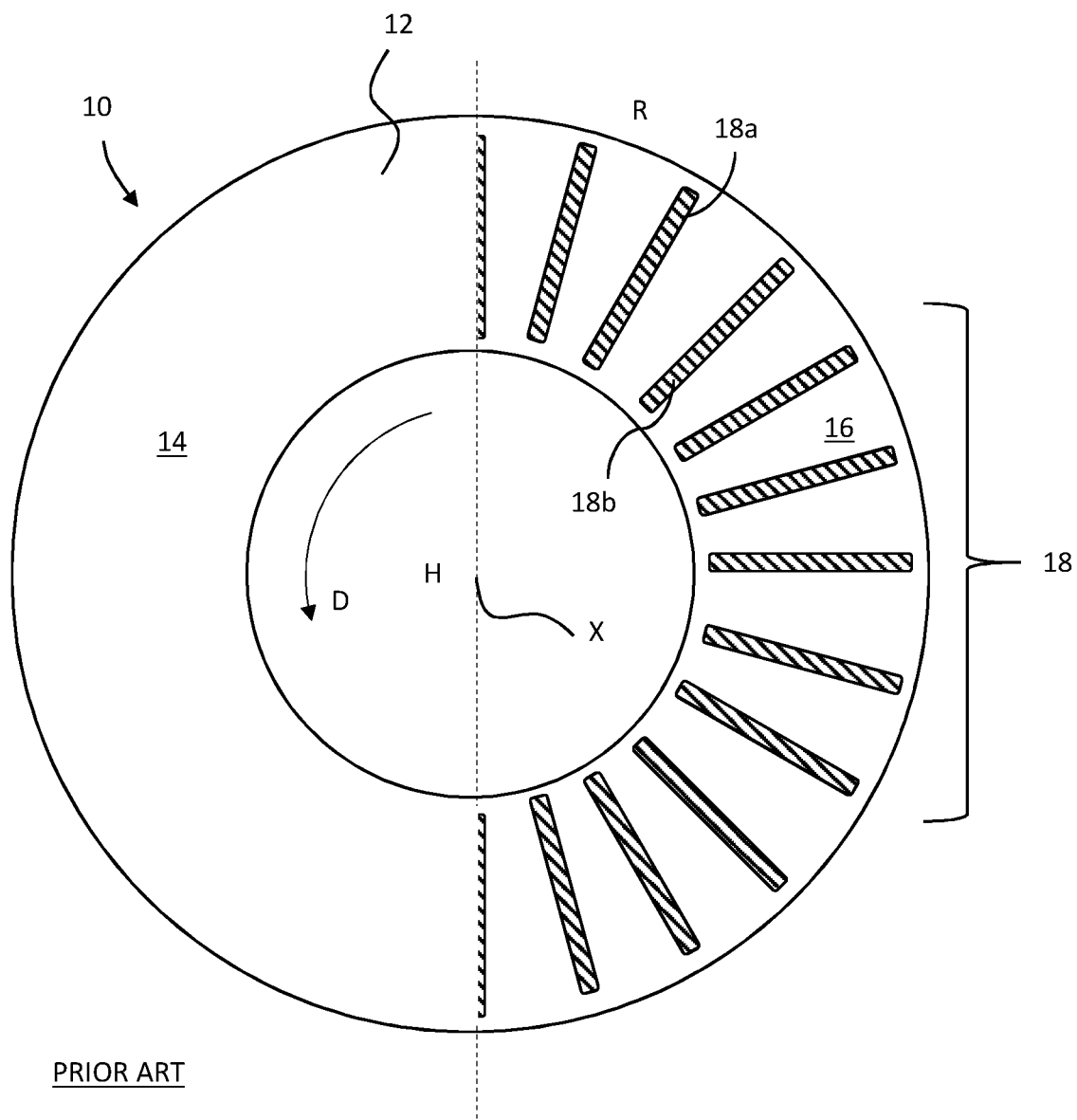
FIG. 1 is a partial section view of a prior art brake disc.
Figure 2:
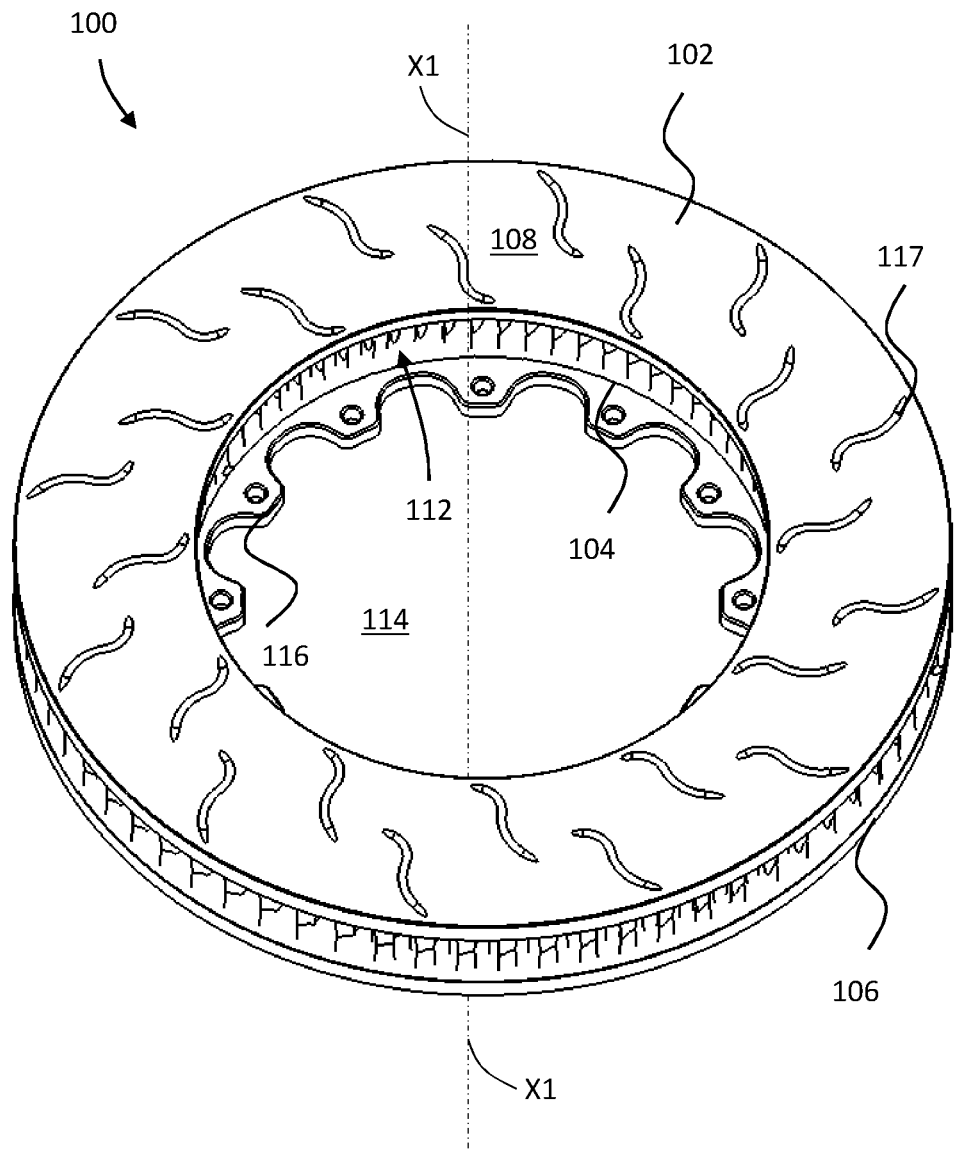
FIG. 2 is a perspective view of a first brake disc in accordance with the present invention.
Figure 3:
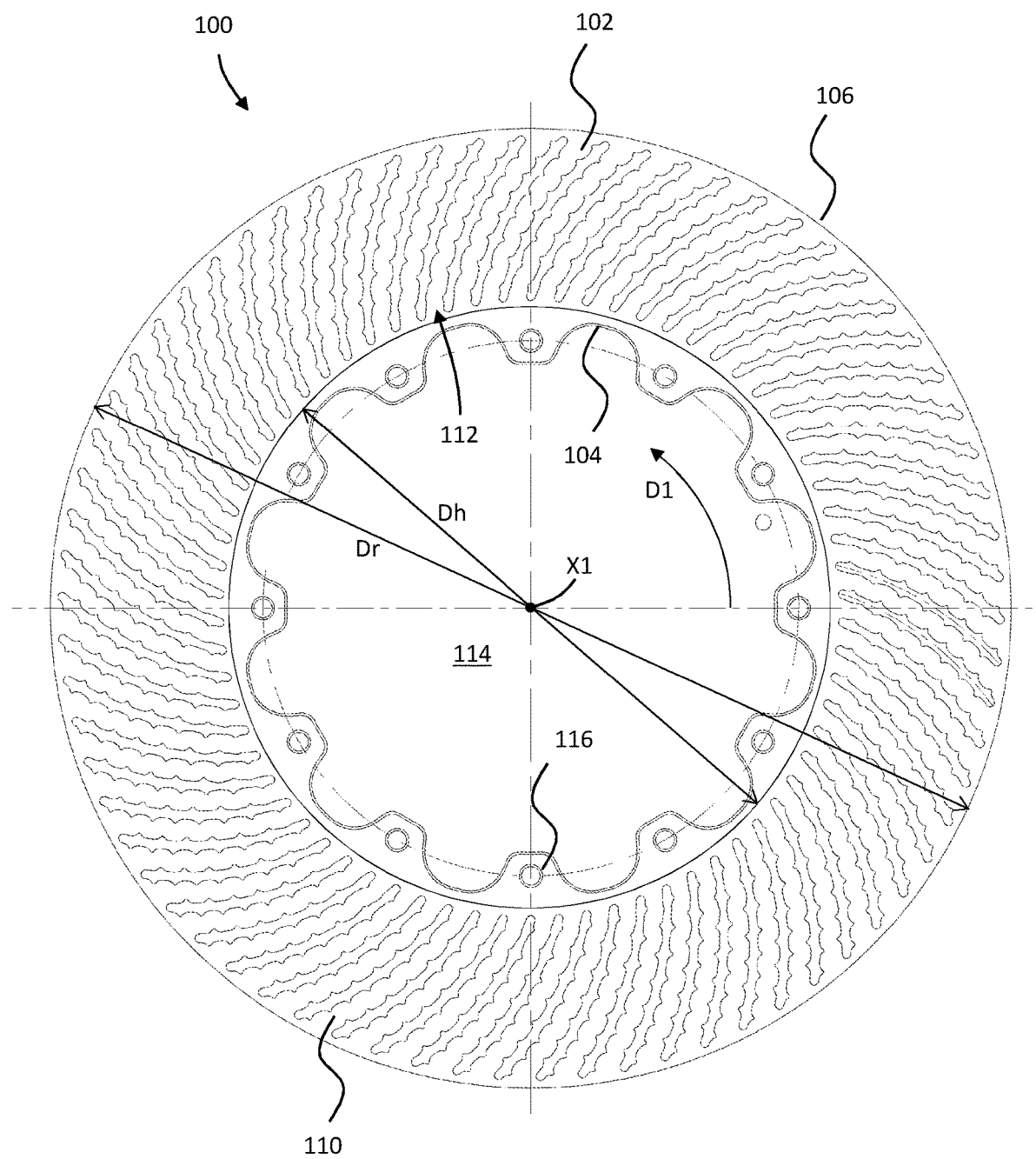
FIG. 3 is a section view of the disc of FIG. 2 midway through the thickness of the disc in an axial direction.

A ventilated disc 100 according to the invention is shown in FIGS. 2 to 6. The disc 100 has an axis of rotation X1, and the axial, radial and circumferential directions are defined with respect to this axis as known in the art. The disc 100 comprises a generally annular disc body 102 defining an inner hub region 104 (having diameter Dh) and an outer rim 106 (having diameter Dr). The body has a first disc plate 108, a second disc plate 110 and a vane structure 112 between the first and second disc plates 108, 110, the vane structure 112 separating the first and second disc plates. A hub opening 114 is defined in the centre of the body 102 and is delimited by the inner hub region 104. A plurality of equally spaced lugs 116 extend into the opening 114 from the inner hub region 104, and define formations for attachment to a vehicle. A series of "S" shaped grooves or slots 117 are formed on the outer surface of the plates 108, 110. The slots 117 do not pass through the thickness of the plates 108, 110, and act to collect and eject brake dust and other contaminants from the disc surface.

The spacing between the disc plates 108, 110 allows passage of air therebetween in a radially outward direction from the hub to the rim. The vane structure 112 comprises 70 identical vanes 112a, 112b, 112c, 112d, 112e etc. which connect the first and second disc plates 108, 110 (the vane structure 112 is shown in section in FIG. 3, although hatching has been omitted for clarity). The vane structure 112 defines a plurality of radially and circumferentially extending channels 113 between each vane 112, 112b etc. The channels 113 become wider at the rim 106 than the hub region 104.

Figure 4:
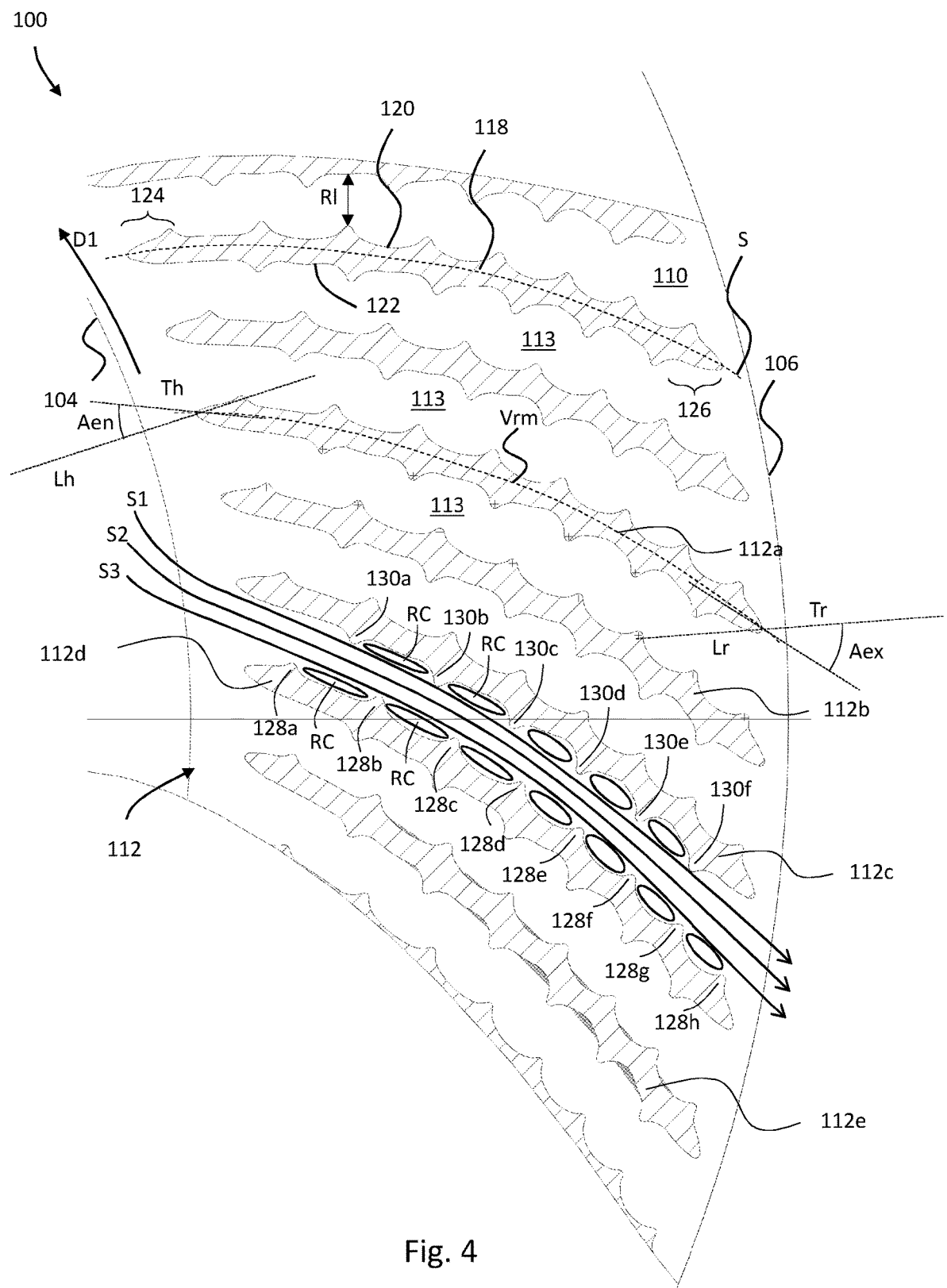
FIG. 4 is a detail section view of a part of the disc shown in FIGS. 2 and 3.

In cross section, as shown in FIG. 4, each vane 112a, 112b etc. is elongate and extends from proximate the inner hub region 104 to proximate the rim 106. The vanes 112 are thereby entirely contained within the space between the first and second disc plates 108, 110. Each vane 112 comprises a unitary vane body 118 (which vane body is also unitary with the plates 108, 110). The vane body 118 is curved and defines an elongate first surface 120 (which is generally convex from hub to tip), and an elongate second surface 122 (which is generally concave from hub to tip). The first and second surfaces 120, 122 define the leading and trailing sides of the vane 118 (depending on the direction of rotation) and face in opposite circumferential directions.

Figure 5:
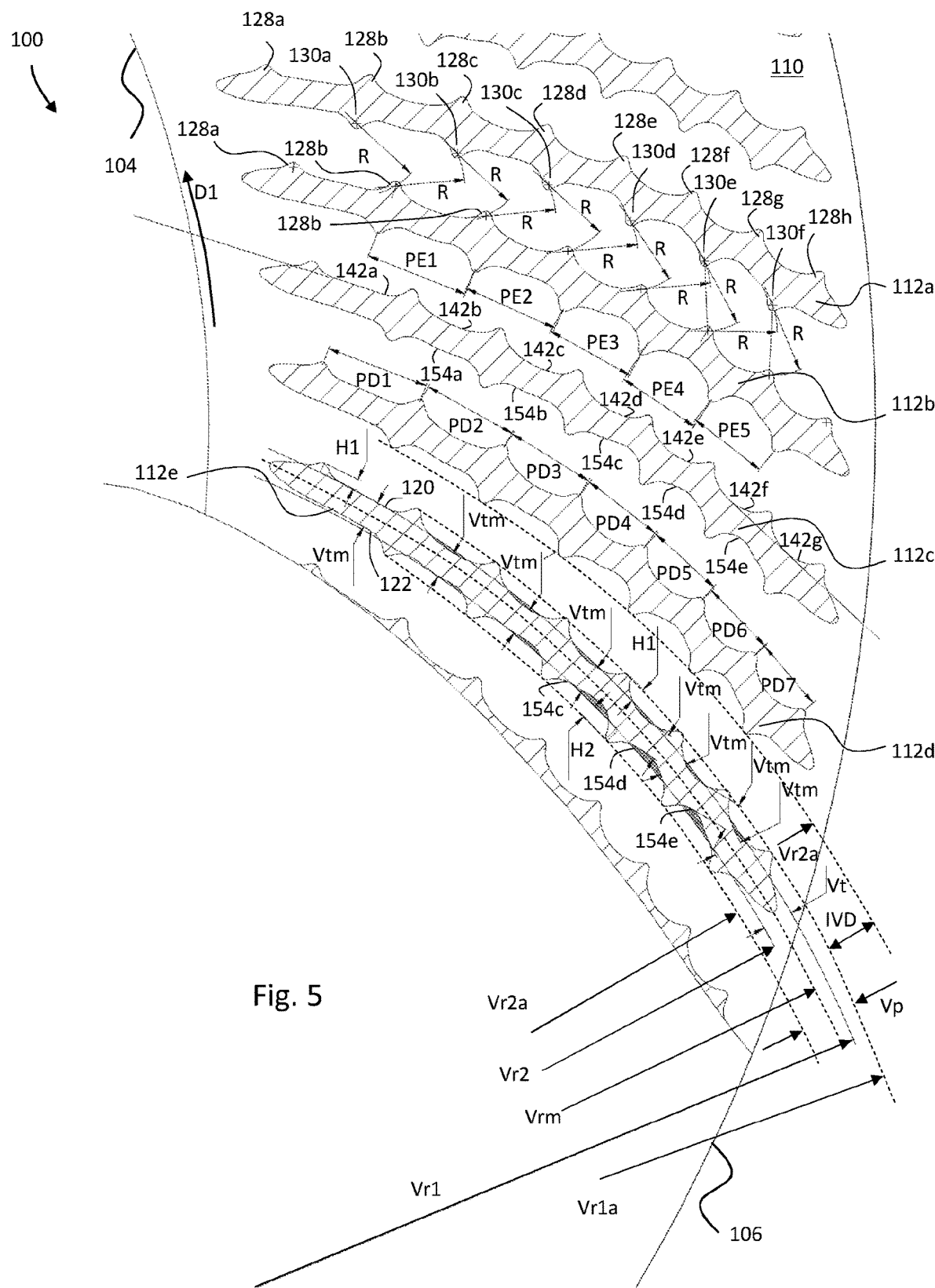
FIG. 5 is a detail section view similar to FIG. 4.

The vane bodies 118 are tapered at each end to a respective hub tip 124 and rim tip 126 where the first surface 120 and second surface 122 meet. The vane body 118 lies on a circle segment Vrm as shown in FIG. 5. Vrm is the notional centreline of the vane body 118, and passes through both tips 124, 126. The curve Vrm is also wholly contained within the vane body between the tips 124, 126, even though the outer profile of the vane is not a smooth curve.

The first and second surfaces 120, 122 describe circle segments Vr1 and Vr2 respectively having a common centre point (also common with circle segment Vrm). The difference in radius between the first and second surfaces 120, 122 is defined as the nominal vane thickness Vt (also shown in FIG. 5).

Because the vane bodies 118 are curved, they extend both radially (i.e. from hub to rim) and circumferentially (i.e. around the disc).

Referring to FIG. 4, each vane 112 defines an entry angle Aen and an exit angle Aex. The entry angle Aen is defined at the hub end of the vane 112a. The entry angle Aen is defined as the angle between a radial line of the disc Lh passing through the hub tip 124 and a tangent Th of the circle segment Vrm at the hub tip 124. Similarly the exit angle Aex is defined as the angle between a radial line of the disc Lr passing through the rim tip 126 and a tangent Tr of the first surface at the rim tip 126. Aex is greater than Aen.

Each vane body 118 defines a plurality of protrusions on the convex and concave sides 120, 122.

Figure 6:
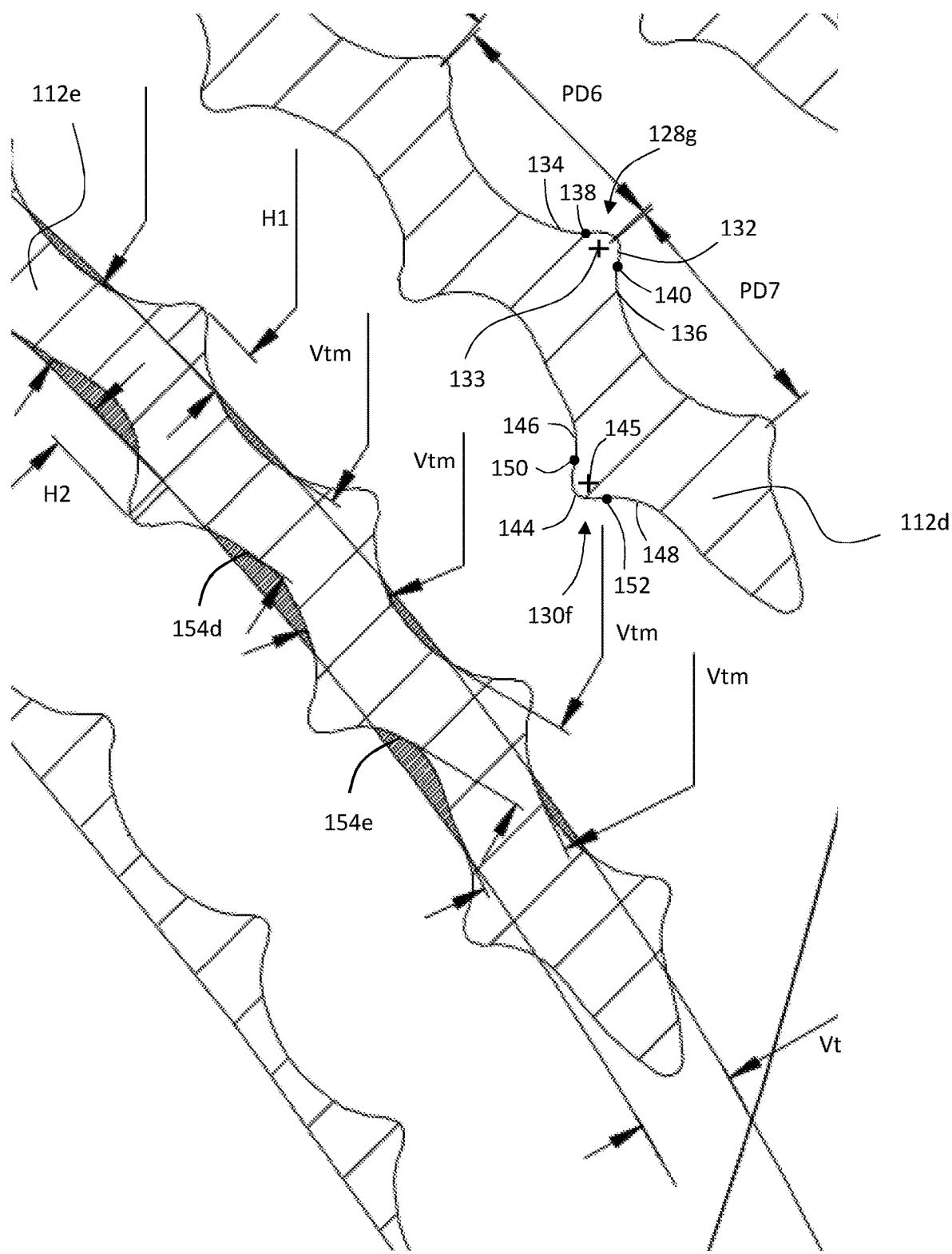
FIG. 6 is a close detail view of a part of FIG. 5.

On the first surface 120, eight protrusions 128a-128h are provided, facing perpendicularly outwardly from the first surface 120, and in a generally (although not exactly) circumferential direction of the disc. Referring to FIG. 6, single protrusion 128g is shown in detail (it will be understood that the protrusions are generally the same shape). The protrusion 128g comprises a convex tip 132 describing a near 180 degree arc with a geometric centre point 133. On either side, the tip 132 meets a respective concave root 134, 136 at points of inflection 138, 140. Each concave root 134, 136 meets the adjacent protrusion (or tip) via a land 142a-142g. The lands 142a-142g are flatter (i.e. of lesser curvature, shallower or flatter) than the protrusions, and generally follow the path of the first surface 120. The aforementioned features provide vanes with a concave, scalloped appearance. The vanes have a dentate profile, which could also be described as undulating (with a smaller curvature on the peaks formed by the protrusions than the troughs). The vane outer profiles therefore resemble elongate holly-leaves.

Each protrusion has a height H1 above the circle segment Vr1, which is the same for all of the convex side protrusions 128b-128h. Protrusion 128a is of slightly lower height. The protrusions are spaced apart (between their respective centre points 133) by linear distances PD1-PD7. In this example, PD1 is about 10 mm, and gradually reduces to PD7 at about 7 mm (i.e. the protrusions 128a-128h get gradually closer together). The ratio of protrusion spacing to height ranges from 4.8:1 to 6.8:1.

The tips of the protrusions 128a-128h describe a circle segment with radius Vr1a on the radially outer side of the body centreline Vrm.

On the concave side 122, six protrusions 130a-130g are provided, facing in a generally circumferential direction of the disc, or more specifically perpendicularly outwardly from the second surface 122. The protrusions 130a-130g are also height H1 from the circle segment Vr2. Referring to FIG. 6, protrusion 130f if shown in detail. Each protrusion 130a-130h comprises a convex tip 144 with a geometric centre point 145. On either side, the tip 144 meets a respective concave root 146, 148 at points of inflection 150, 152. Each concave root 146, 148 meets the adjacent protrusion (or tip) via a land 154a-154e. The lands 154a-154e are flatter (i.e. of lesser curvature) than the protrusions, and follow the path of the second surface 122.

The tips of the protrusions 130a-130h describe a circle segment with radius Vr2a on the radially inner side of the body centreline Vrm.

The distance between the circle segments Vr1a and Vr2a is Vp. The position of the body centreline Vrm is (in this example) midway through Vp—i.e. 0.5Vp from both Vr1a and Vr2a. Referring to FIG. 5, the distance from the curve Vr1a joining the tips of the protrusions 128a etc on the convex side of a first vane (vane 112e in this instance) is an inter-vane distance IVD from the curve Vr2a joining the tips of the protrusions 130a etc on the concave side of an adjacent vane (vane 112d in this instance). In this case, the inter-vane distance IVD=0.6Vp proximate the hub region 104, rising to 0.8Vp at the rim 106.

As shown with respect to vane 112e in FIG. 5, the lands 142a-142e, and 154a to 154e in particular are recessed to make the vanes as thin as possible, to the minimum castable thickness Vtm. As such the vanes are thinned at the lands to this dimension to make the disc as light as possible. The most thinning (shown in lands 154c, 154d 154e) occurs where the lands on the concave side of the vane are directly opposite the protrusions on the convex side of the vane.

Each protrusion has a height H2, which is the same for all of the concave side protrusions 130a-130f, and the same as the convex side protrusions 128b-128h. The protrusions are spaced apart (between their respective centre points 145) by linear distances PE1-PE5. In this example, PE1 is 10.19 mm, and gradually reduces to PE7 at 7.9 mm (i.e. the protrusions 130a-130f get gradually closer together). As such, the ratio of protrusion spacing to height ranges from 5.3:1 to 6.8:1.

Because the convex side of the vane has more protrusions than the concave side, and because the protrusions are generally equally spaced along the vane, at the hub end the protrusions are opposite, but become offset towards the rim. Therefore at the hub, the protrusions 128a and 130b are opposite, but near the rim the protrusions 128g and 130f are not. By "generally equally spaced" we mean spaced apart by distances within a tolerance of 30% of the maximum distance.

The first surface 120 of a first vane faces the second face 122 of the adjacent vane. Referring to FIG. 5, the centres of the facing protrusions are spaced apart by a minimum adjacent protrusion distance R. As such, any given protrusion is the distance R away from the nearest protrusion on the adjacent facing vane. Referring to FIG. 5, protrusion 128b of vane 112b is distance R away from protrusion 130a of vane 112a. Protrusion 130a on vane 112a is distance R away from protrusions 128a and 128b on vane 112b. Protrusion 128b is distance R away from protrusions 130a and 130b on vane 112a and so on. The selection of distance R is determined by two main factors—(i) it must be equal to, or higher than, the minimum distance required for a cutter to pass between the vanes 112a and 112b when machining the core box and (ii) to be as small as possible to fit as many protrusions onto the vanes as possible. The result is that each land on a first given vane is opposite a protrusion on the adjacent vane. In other words, the protrusion (which extends perpendicular to the respective vane surface 120, 122) points to a land on the facing surface. The protrusions are staggered to provide a distance between them which allows a cutter to pass. In this example, R=5.8 mm, and the ratio of R to protrusion height is 3.87:1.

As well as the minimum adjacent protrusion distance R, each protrusion is a minimum adjacent land distance Rl from the nearest land on the adjacent vane (shown in FIG. 4). Again, Rl must be equal to, or higher than, the minimum distance required for a cutter to pass between the adjacent vanes when machining the core box. In this case the minimum Rl=5.58 mm, and the ratio of Rl to protrusion height is 3.72:1. Effectively, R and Rl represent the minimum width of the channels 113, and the ratio of the height of the protrusions to the width of the channels 113 is in the range 3.5-4:1.

This arrangement results in a generally serpentine flow channel 113, and also has beneficial thermodynamic effects, as will be explained below.

During vehicle motion, the disc 100 rotates in direction D1. As it does so, ambient air is entrained by the vanes 108 and moved from the hub to the rim due to a centrifugal pumping effect. Referring to FIG. 4, streamlines S1, S2, S3 show the path of the cooling air from the hub region 104 to the rim 106.

The protrusions 128a-128h and 130a-130f create recirculating regions RC which promote mixing in the boundary layer and hence improved heat transfer between the vanes 112 and the fluid represented by streamlines S1, S2, S3. The distance between the protrusions, or more particularly the ratio of protrusion height to distance apart (in this example in the range 4.8:1-6.8:1) is an important factor, in that it controls the size of the recirculations. This ratio is important—if the ratio was too high (i.e. very large lands) the recirculations would likely only occupy the first part of the land. If the ratio was too small the mixing would be less effective.

Formation of the recirculating regions RC is also benefitted by the fact that the facing protrusions are offset—i.e. the flow is stabilised by the fact that offsetting the opposing protrusions allows for the width of the channels 113 to be more consistent in the radial direction.

Convection of the air along streamlines S1 to S3 towards the rim 106 and out of the disc body 102 moves heat energy created by friction from braking away from the brake. Therefore encouraging a radial air flow in this manner helps to cool the disc body 102.

Figure 7:
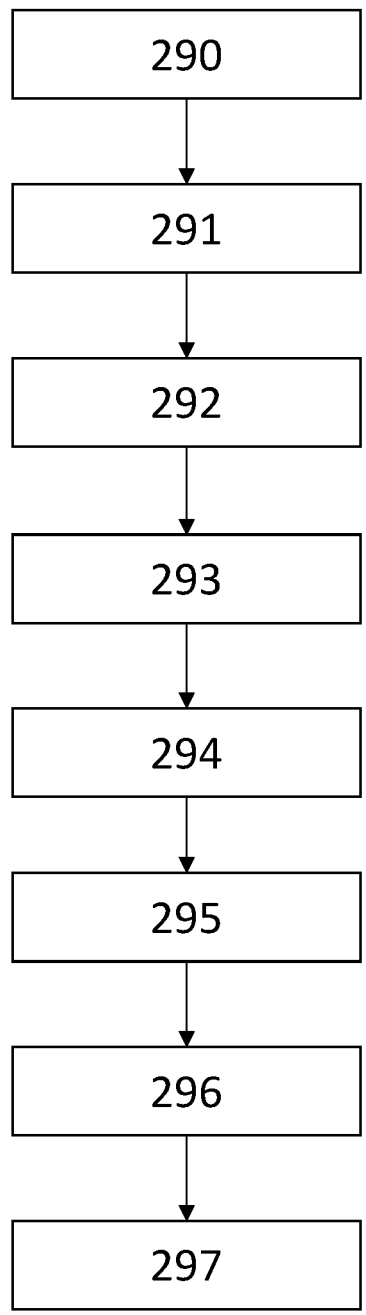
FIG. 7 is a schematic representation of a manufacturing process in accordance with the present invention.

The disc 100 is manufactured by sand casting. Referring to FIG. 7, a method of manufacturing a disc according to the present invention is shown.

At step 290, a core box is machined from solid in two parts, split along a plane midway through the thickness of the disc. The two parts of the core box each define a part of the vanes 112. The channels 113 are machined between the vane profiles in the core box using a cutter having a diameter D which is less than R, and as such able to pass between the adjacent vanes. The shape of the protrusions is well suited to this manufacturing method because the smooth shape (convex tip blending into concave root) can be made in a single pass of the cutting head.

When placed together, the core box defines a mould for the sand core (which itself is part of the mould for the interior features of the disc). Sand is introduced into the core and consolidated to form the core. The core of sand is then demoulded. At this point, the core is a negative of the disc cavities.

The core is then mounted into a moulding box, and together they form a mould profile for the complete disc. Molten metal is introduced into the moulding box with the core in situ, and solidified. The disc (with the sand core intact) can then be demoulded. The sand core is broken up in situ (e.g. by vibration) and removed.

In step 291, the two halves of the core box are placed together and used to mould the core from sand. The core is then demoulded from the core box at step 292. At step 293, the core is placed between two parts of a moulding box which defines the outer profile of the disc. The moulding box is also in two parts with a split line midway through the thickness of the disc in an axial direction.

Molten metal is introduced into the mould cavity in step 294 and allowed to solidify in step 295. At step 296 the brake disc is demoulded, and any remaining sand is removed with vibration treatment at step 297.

Figure 8:
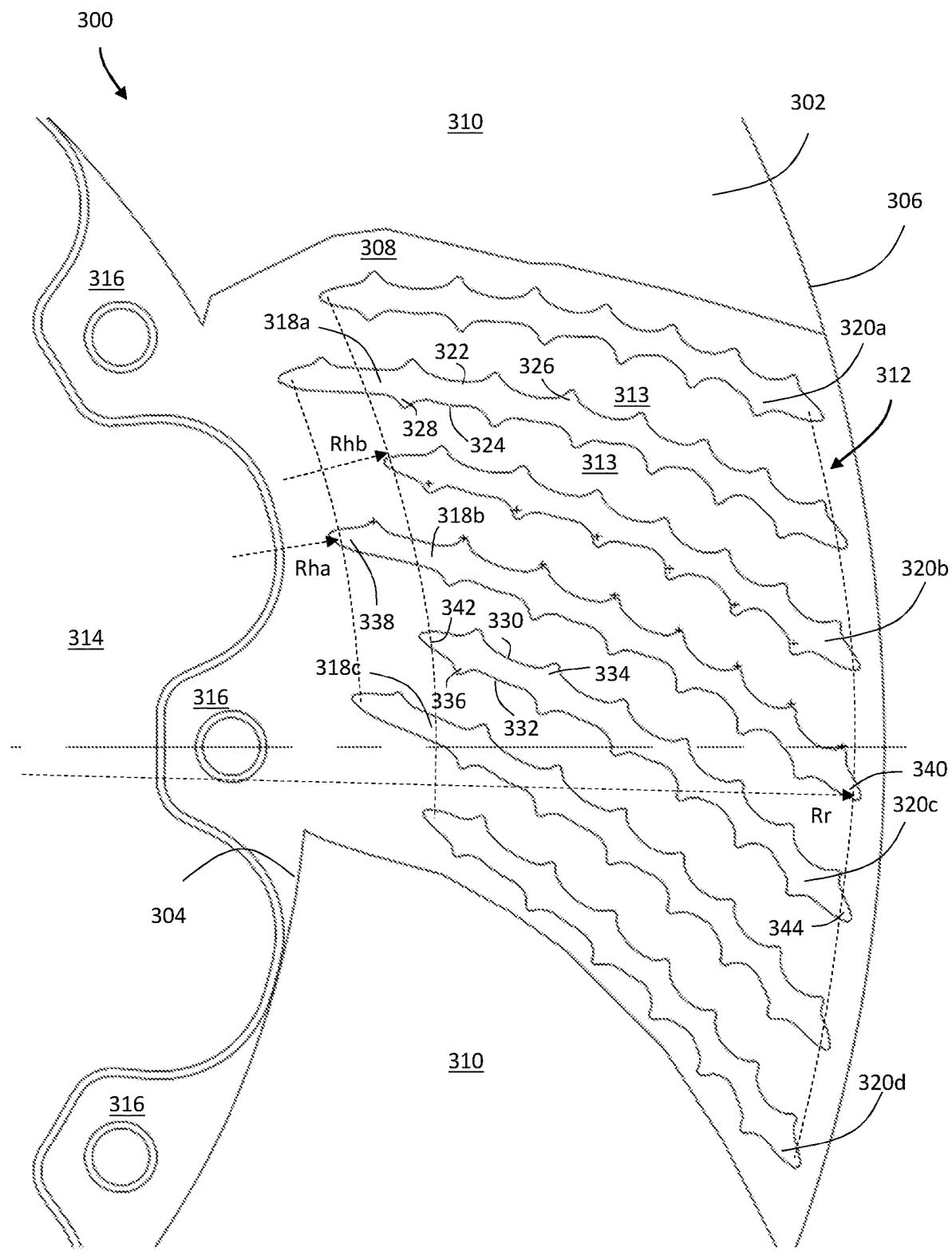
FIG. 8 is a view similar to FIG. 4, of a second brake disc in accordance with the present invention.

Turning to FIG. 8, a second brake disc 300 in accordance with the present invention is similar to the brake disc 100.

The disc 300 comprises a generally annular disc body 302 defining an inner hub region 304 and an outer rim 306. The body has a first disc plate 308, a second disc plate 310 and a vane structure 312 between the first and second disc plates 308, 310, the vane structure 311 separating the first and second disc plates. A hub opening 314 is defined in the centre of the body 302 and is delimited by the inner hub region 304. Twelve equally spaced lugs 316 extend into the opening 314 from the inner hub region 304, and define formations for attachment to a vehicle.

The spacing between the disc plates 308, 310 allows passage of air therebetween. The vane structure 312 comprises a first set of 35 vanes 318a, 318b, 318c etc. which are substantially identical to the vanes 112 in the disc 100. Each vane 318a etc. defines a convex side 322 and a concave side 324. The convex side 322 defines eight protrusions 326. The concave side 326 defines six protrusions 328. Between each of the vanes 318a etc. are interspersed a second set of vanes 320a, 320b, 320c etc. The second set of vanes 320a etc. are shorter than the vanes 318a etc. Each vane 320a etc. defines a convex side 330 and a concave side 332. The vanes 320a are truncated versions of the vanes 318a etc., and as such only define seven protrusions 334 on the convex side 330 and five protrusions 336 on the concave side 332. A section of vane (and associated protrusions) nearest the hub region 304 are not present in the vanes 320a etc.

Each of the first set of vanes 318a etc. has a hub tip 338 at radius Rha, and a rim tip 340 at radius Rr. Each of the second set of vanes 320a etc. has a hub tip 342 at radius Rhb, and a rim tip 344 also at radius Rr. Therefore the second set of vanes 320a etc. start at a higher radius (further from the disc axis) then the first set 318a etc.

The vanes alternate to define a plurality of radially and circumferentially extending channels 313 between them. The channels 313 become wider at the rim 306 than the hub region 304.

This arrangement saves weight (the second set of vanes 320a etc. are smaller and lighter) whilst providing the thermodynamic benefits of the invention.

Figure 9:
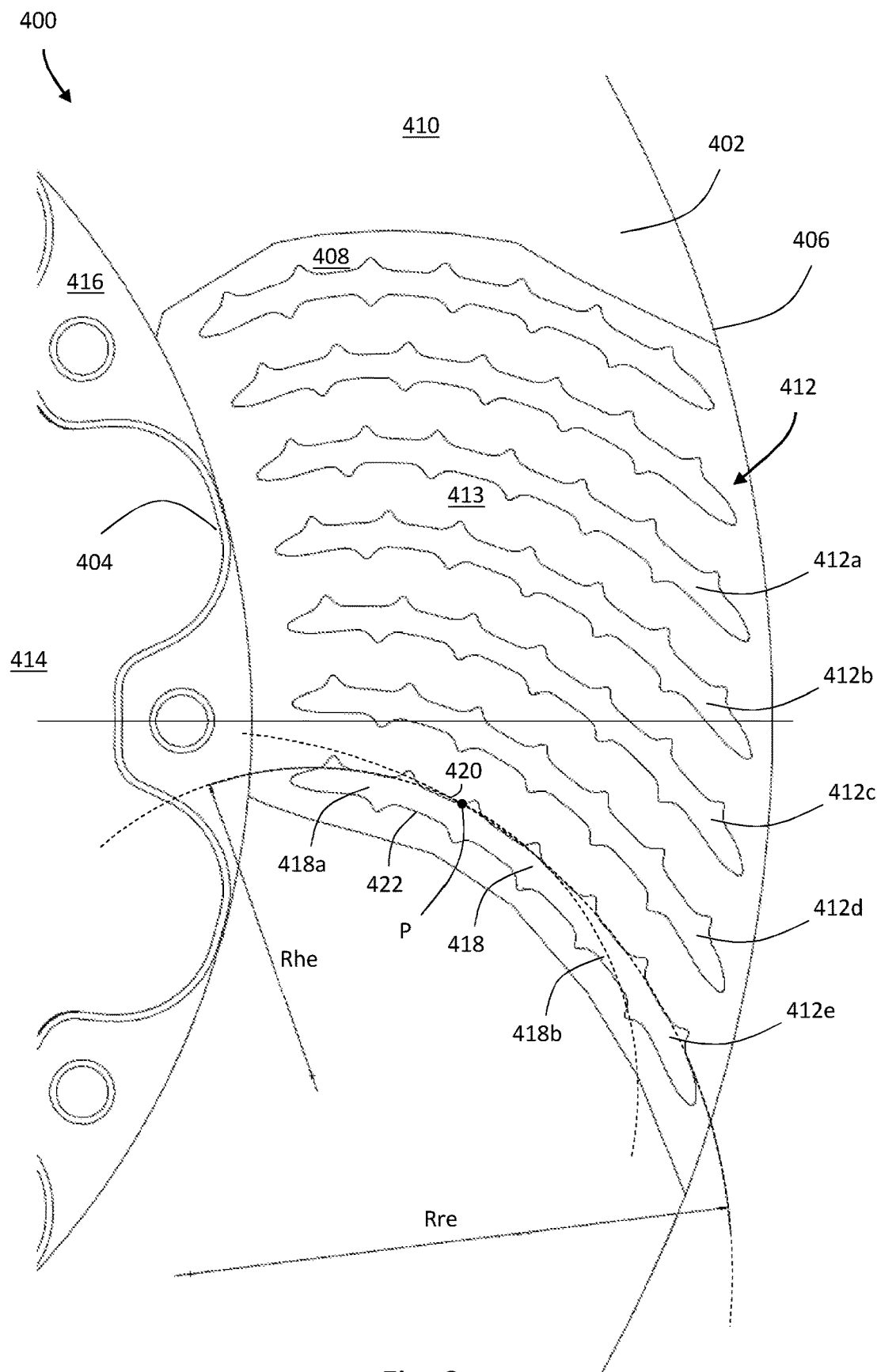
FIG. 9 is a view similar to FIG. 4, of a third brake disc in accordance with the present invention.

Turning to FIG. 9, a third brake disc 400 in accordance with the present invention is similar to the brake disc 100.

The disc 400 comprises a generally annular disc body 402 defining an inner hub region 404 and an outer rim 406. The body has a first disc plate 408, a second disc plate 410 and a vane structure 412 between the first and second disc plates 408, 410, the vane structure 412 separating the first and second disc plates. A hub opening 414 is defined in the centre of the body 402 and is delimited by the inner hub region 404. Twelve equally spaced lugs 416 extend into the opening 414 from the inner hub region 404, and define formations for attachment to a vehicle.

The spacing between the disc plates 408, 410 allows passage of air therebetween. The vane structure 412 comprises 70 identical vanes 412a, 412b, 412c, 412d, 412e etc. which connect the first and second disc plates 408, 410 (the vanes 412 are shown in section in FIG. 9, although hatching has been omitted for clarity). The vanes define a plurality of radially and circumferentially extending channels 413 between them. The channels 413 become wider at the rim 406 than the hub region 404.

In cross section, as shown in FIG. 9, each vane 412a, 412b etc. is elongate and extends from proximate the inner hub region 404 to proximate the rim 406. The vanes 412 are thereby entirely contained within the space between the first and second disc plates 408, 410. Each vane 412 has a unitary vane body 418 (which vane body is also unitary with the plates 408, 410). The vane body 418 is curved and thereby defines a first surface 420, and a second surface 422 facing in opposite circumferential directions.

The vane body 418 lies on two circle segments. At the hub end, as demonstrated by radius of curvature Rhe of the first surface 420, a first vane body section 418*a* has a relatively tight curvature. At the rim end, as demonstrated by radius of curvature Rre of the first surface 420 a second vane body section 418*b* has a relatively shallow curvature. In other words, Rhe<Rre. The transition from Rhe to Rre occurs at point P, about ⅓ of the way along the vane 412*e* from the hub to the rim.

Figure 10:
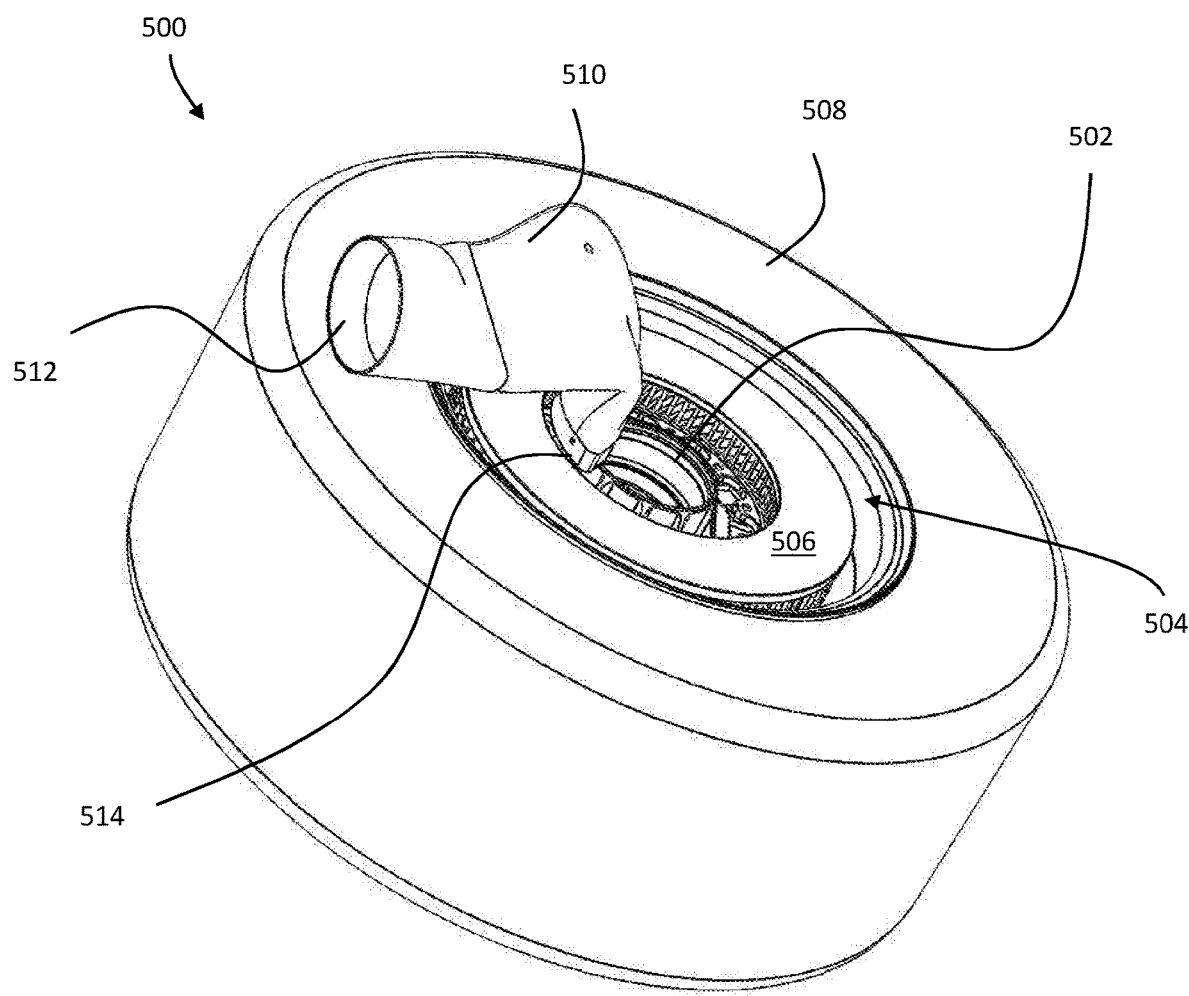
FIG. 10 is a perspective view of a wheel assembly incorporating a brake disc in accordance with the present invention.

Referring to FIG. 10, a wheel assembly 500 is shown. The assembly 500 is from a motorsport vehicle, and comprises a wheel 502 to which a disc brake 504 is attached. A brake disc 506 according to the present invention (for example disc 100) forms part of the disc brake 504 and is attached for rotation with the wheel 502 (as known in the art). A brake caliper is not visible in FIG. 10, but it will be understood that such a caliper is present in order to clamp the disc and brake the wheel. A tyre 508 is assembled with the wheel 502.

An air duct 510 is provided in the vicinity of the wheel. The air duct 510 is attached to the steering knuckle of the vehicle. The air duct 510 defines an inlet 512 which in use faces forward on the vehicle. In other words, the inlet 512 faces in a direction parallel with the radial direction of the wheel and disc. The air duct 510 defines an outlet 514 which faces in a direction parallel to the axis of the wheel and disc, and sits within the opening in the disc hub. Therefore a flow path through the duct 510 passes through 90 degrees to direct air from a generally radial to a generally axial direction.

In use, as the vehicle moves, air enters the inlet 512, and passes through 90 degrees to the outlet 514 where it enters the hub of the disc. This air is then forced radially outwardly both by the pressure created as a result of forward motion of the vehicle (a "ram air" effect), and by the centrifugal pumping effect of the disc. The pressurised cooling air passes though the vane structure of the disc 506 in a radially outward direction and, as it does so, heats up by conduction, cooling the disc. Thermal energy is then carried away by convection.

The discs according to the present invention perform particularly well under these forced convection conditions—i.e. in a brake with a forced air duct delivering cooling air with a pressure above ambient.

Under test conditions, whereby a disc with swept vanes and no protrusions was compared to the performance of a disc according to the invention, the following improvements were seen in the latter:

Cooling efficiency increased by between 20% and 25% (e.g. from 50% to 70%). The cooling efficiency is defined as the proportion of brake power (kW) being converted into the thermal energy of the air flow from the disc rim (kW). The energy of air flow was obtained from the mass flow through the disc, the inlet temperature (at the hub) and the exit temperature, Air temperature at the vane exit increased by an average of 120 degrees C. over a like-for-like cycle, indicating that more thermal energy was being conducted into the air flow.

There was 10% less mass flow in the duct, as a result of the increased flow restriction created by the protrusions, but as mentioned above both efficiency and absolute temperature at the exit were significantly improved.

Variations fall within the scope of the present invention.

Although it is beneficial to maximise the number of vanes for strength and cooling effect, fewer vanes may be provided to reduce weight.

The protrusions may be provided on one vane side only, although this is not as preferably as both vane sides. Similarly, the protrusions may be provided on a subset of vanes, although again this is not as beneficial.

The brake disc according to the invention may be manufactured by any suitable means—not just by casting. For example, rapid prototyping techniques may be used to form the core or disc itself. Additive layer manufacturing may also be used.

The arc geometry may be varied such that the position of the body centreline Vrm is not exactly midway through Vp. For example, Vr1*a* could be 0.6Vp from Vrm (leaving Vr2*a* 0.4Vp from Vrm). Alternatively Vr1*a* could be 0.4Vp from Vrm (leaving Vr2*a* 0.6Vp from Vrm). Preferably Vrm is between 0.6Vp and 0.4Vp from Vr1*a*.

The inter vane distance IVD may be in the range of 0.5 to 1.5.

The invention claimed is:

1. A ventilated brake disc comprising a disc body having a first disc plate, a second disc plate, the disc plates having radially inner and outer edges, and a vane structure between the first and second disc plates, the vane structure separating the first and second disc plates to allow passage of fluid therebetween, the vane structure defining a plurality of vanes, the vanes connecting the first and second disc plates, each vane having two circumferentially facing sides, each vane being continuously swept to extend unbroken in a radial and circumferential direction along a centerline from a first tip positioned proximate to the radially inner edges of the disc plates to a second tip positioned proximate to the radially outer edges of the disc plates such that no other vane is arranged between the first tip and the radially inner edges along the centerline and no other vane is arranged between the second tip and the radially outer edges along the centerline, each vane defining a plurality of protrusions on each of the two circumferentially facing sides with adjacent protrusions being separated by a land, the land having a flat profile or a curved profile with a curvature less than a curvature of the adjacent protrusions, wherein at least two adjacent vanes have sets of protrusions on respective circumferentially facing sides arranged toward one another, and at least some of the protrusions of the sets of protrusions face lands on the adjacent vane.

2. The ventilated brake disc according to claim 1, wherein the protrusions extend perpendicular to the respective circumferentially facing vane side.

3. The ventilated brake disc according to claim 2, wherein the circumferentially facing side is arcuate, and the protrusions point in a generally radial direction of the circumferentially facing side.

4. The ventilated brake disc according to claim 1, wherein the distance between at least two adjacent protrusions of the plurality of protrusions is greater than their circumferential height from the respective vane.

5. The ventilated brake disc according to claim 1, wherein the distance between at least two adjacent protrusions of the plurality of protrusions is less than ten times their circumferential height from the respective vane.

6. The ventilated brake disc according to claim 1, wherein each of the vanes has a generally curved profile, and wherein the flat profile or the curved profile of the land at least partly follows the curved profile of each of the vanes.

7. The ventilated brake disc according to claim 1, wherein all of the protrusions face lands on the adjacent vane.

8. The ventilated brake disc according to claim 1, wherein at least some of the protrusions lie on, or outside, a protrusion clearance radius extending from each of the two nearest protrusions on the adjacent vane.

9. The ventilated brake disc according to claim 1, wherein a single flow channel is defined between adjacent vanes, which flow channel has a generally serpentine path.

10. The ventilated brake disc according to claim 1, wherein the protrusions comprise a tip defined by a convex curve, and wherein the tip of the protrusions meets concave root portions on either side of the tip.

11. The ventilated brake disc according to claim 10, wherein a radius of the convex tip is equal to, or less than, the circumferential height of the protrusions from the respective vane.

12. The ventilated brake disc according to claim 1, wherein each of the vanes lies on a circle segment.

13. The ventilated brake disc according to claim 12, wherein each of the vanes lies on a single circle segment or on more than one circle segment of differing radii.

14. The ventilated brake disc according to claim 12, wherein a tangent of each of the vanes at the first tip of each of the vanes and extending from the circle segment at the first tip of each of the vanes makes an inlet angle with a radial line of the brake disc, and wherein the tangent of each of the vanes at the second tip of, each of the vanes extending from the circle segment at the second tip of each of the vanes makes an outlet angle with a radial line of the brake disc, and wherein the outlet angle is greater than the inlet angle.

15. A brake assembly for a vehicle comprising a ventilated brake disc according to claim 1, wherein the ventilated brake disc is arranged to rotate in a direction with the first tip of each of the vanes leading the second tip of each of the vanes when the vehicle is in forward motion.

16. A method of manufacture of a ventilated brake disc comprising the steps of:
   manufacturing a first core pattern defining a first disc plate of a brake disc and a first plurality of vane portions extending therefrom, the first disc plate having radially inner and outer edges;
   manufacturing a second core pattern defining a second disc plate of a brake disc and a second plurality of vane portions extending therefrom, the second disc plate having radially inner and outer edges;
   wherein each of the vane portions of the first and second pluralities of vane portions are continuously swept to extend unbroken in a radial and circumferential direction along a centerline from a first tip positioned proximate to the radially inner edges of the first and second disc plates to a second tip positioned proximate to the radially outer edges of the first and second disc plates such that no other vane is arranged between the first tip and the radially inner edges along the centerline and no other vane is arranged between the second tip and the radially outer edges along the centerline, each of the vane portions of the first and second pluralities of vane portions defining a plurality of protrusions on at least one circumferentially facing side, the protrusions are separated by lands, and the protrusions on a first vane portion of the first plurality of vane portions faces lands on an adjacent second vane portion of the first plurality of vane portions;
   assembling the first and second core patterns to form a core cavity;
   forming a mould core in the core cavity;
   providing a mould for a brake disc;
   assembling the mould core and the mould to form a disc cavity;
   filling the mould with a molten material;
   allowing the molten material to set to form a brake disc;
   demoulding the brake disc.

17. The method of manufacture of a ventilated brake disc according to claim 16, wherein the steps of manufacturing the first and second core patterns include the step of machining each of the vane portions from a solid material of the core pattern.

18. The method of manufacture of a ventilated brake disc according to claim 17, wherein the step of machining each of the vane portions includes the step of making at least one complete pass with a machine cutter from a radially inner end of each of the vane, portions to a radially outer end of the vane portions or vice versa.

19. A ventilated brake disc comprising a disc body having a first disc plate, a second disc plate, the disc plates having radially inner and outer edges, and a vane structure between the first and second disc plates, the vane structure separating the first and second disc plates to allow passage of fluid therebetween, the vane structure defining a plurality of vanes, the vanes connecting the first and second disc plates, each vane having two circumferentially facing sides, each vane being continuously swept to extend unbroken in a radial and circumferential direction of the disc body along a centerline from a first tip positioned proximate to the radially inner edges of the disc plates to a second tip positioned proximate to the radially outer edges of the disc plates such that no other vane is arranged between the first tip and the radially inner edges along the centerline and no other vane is arranged between the second tip and the radially outer edges along the centerline, each of the vane defining a plurality of protrusions on each of the two circumferentially facing sides, wherein a first set of protrusions of the plurality of protrusions are arranged on a first circumferential side of a first vane of the plurality of vanes, and a second set of protrusions of the plurality of protrusions are arranged on a second, opposite circumferential side of an adjacent second vane of the plurality of vanes, and at least some of the protrusions on the first circumferential side are opposite lands on the second circumferential side.

20. The ventilated brake disc according to claim 19, wherein the lands on the second circumferential side are scalloped such that a mean thickness of the second vane remains substantially constant along its length.

* * * * *